(12) United States Patent
Villi

(10) Patent No.: US 7,491,904 B2
(45) Date of Patent: Feb. 17, 2009

(54) CLAMPING DEVICE FOR CLAMPING FITTINGS IN ELECTRIC BOARD CHANNELS

(75) Inventor: Piergiorgio Villi, Milan (IT)

(73) Assignee: Canalpalst S.p.A., Milan (IT)

( * ) Notice: Subject to any disclaimer, the term of this patent is extended or adjusted under 35 U.S.C. 154(b) by 0 days.

(21) Appl. No.: 11/800,604

(22) Filed: May 7, 2007

(65) Prior Publication Data

US 2008/0230250 A1    Sep. 25, 2008

(30) Foreign Application Priority Data

Mar. 22, 2007   (IT)   .......................... MI20070100 U

(51) Int. Cl.
*H02G 3/04*   (2006.01)

(52) U.S. Cl. ....................... 174/481; 174/480; 174/68.1; 174/101; 174/72 A; 174/135; 439/207; 52/220.5; 248/68.1

(58) Field of Classification Search ................... 174/48, 174/68.1, 68.3, 135, 72 A, 101, 480, 481, 174/95–100; 439/207; 248/49, 68.1, 65, 248/74.3; 52/220.5
See application file for complete search history.

(56) References Cited

U.S. PATENT DOCUMENTS

| | | | | |
|---|---|---|---|---|
| 3,485,937 A | * | 12/1969 | Caveney | 174/101 |
| 3,705,949 A | * | 12/1972 | Weiss | 174/101 |
| 4,942,271 A | * | 7/1990 | Corsi et al. | 174/101 |
| 7,060,893 B1 | * | 6/2006 | Villi | 174/507 |

* cited by examiner

*Primary Examiner*—Dhiru R Patel
(74) *Attorney, Agent, or Firm*—James V. Costigan; Hedman & Costigan, P.C.

(57) ABSTRACT

The invention relates to a clamping device for clamping fittings in electric board channels, comprising a rod element which can be engaged in a cavity formed in electric component channels and coupled, through an end piece, to a fitting supporting body, the supporting body being adapted to be locked on the channels by causing the supporting body to turn about an axis substantially perpendicular to the rod element.

6 Claims, 4 Drawing Sheets

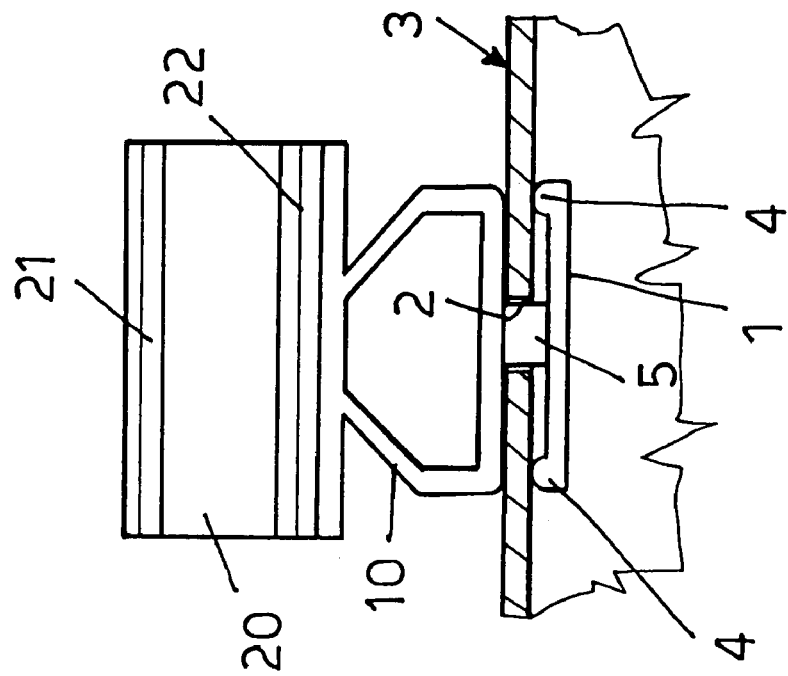
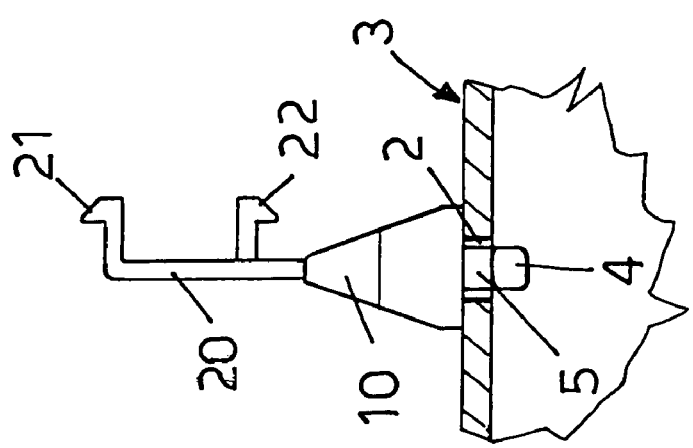

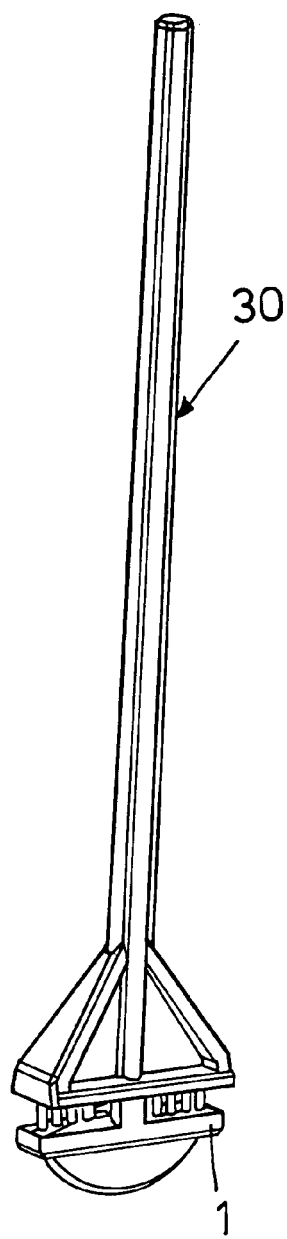
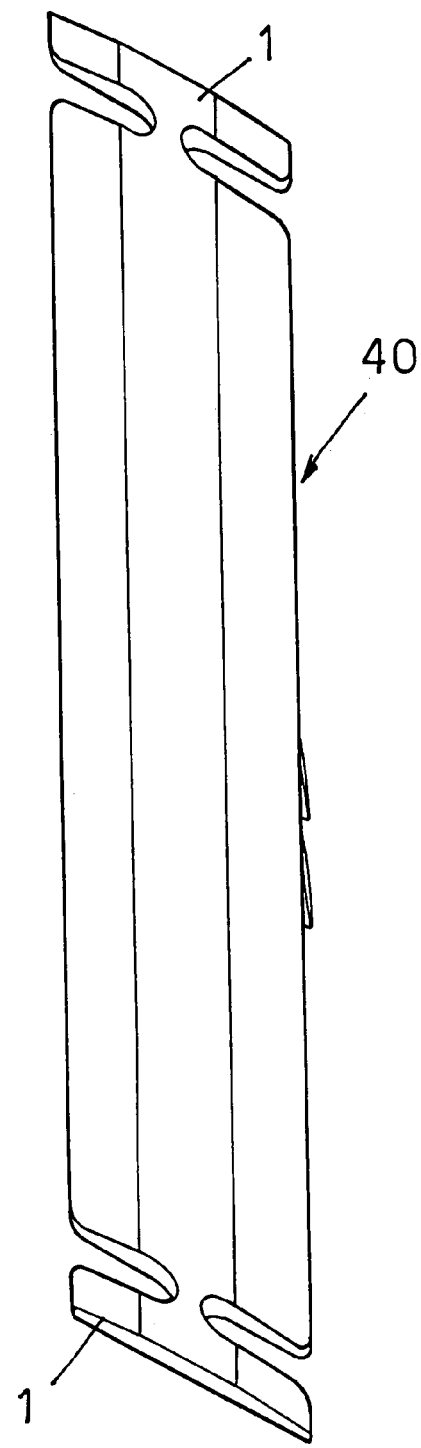
FIG 6
FIG 5

CLAMPING DEVICE FOR CLAMPING FITTINGS IN ELECTRIC BOARD CHANNELS

BACKGROUND OF THE INVENTION

The present invention relates to a clamping device for clamping fittings in electric board channels and the like.

As is known, channels to be used for receiving cables for coupling electric fitting boards, generally comprise cross cavities and slots, allowing the electric fittings to be easily connected, and operating to enhance the operating properties of the receiving channel, while holding the cables arranged therein in an ordered condition.

However, prior approaches for the above intended applications, are affected by great problems related to a proper coupling of the electric fittings, since it is necessary to perform very long and complex connection operations.

SUMMARY OF THE INVENTION

Accordingly, the aim of the present invention is to overcome the above mentioned problem, by providing a clamping device for clamping fittings in electric board channels, allowing to quickly and easily connect the fittings, by performing a very fast and simple movement.

Within the scope of the above mentioned aim, a main object of the invention is to provide such a clamping device which, owing to its specifically designed constructional characteristics, is very reliable and safe in operation.

Another object of the present invention is to provide such a clamping device which can be easily made starting from easily commercially available elements and materials and which, moreover, is very competitive from a mere economic standpoint.

According to one aspect of the present invention, the above mentioned aim and objects, as well as yet other objects, which will become more apparent hereinafter, are achieved by a clamping device for clamping fittings in electric board channels and the like, characterized in that said clamping device comprises a rod element which can be engaged in a cavity defined in channels for electric components and being coupled, through a coupling end piece, to a fitting supporting body, said fitting supporting body being adapted to be locked in said channels by a rotary movement about an axis substantially perpendicular to said rod element.

BRIEF DESCRIPTION OF THE DRAWINGS

Further characteristics and advantages of the present invention will become more apparent hereinafter from the following detailed disclosure of a preferred, though not exclusive, embodiment of a clamping device for clamping fittings in electric board channels and the like, which is illustrated, by way of an indicative but not limitative example, in the accompanying drawings, where:

FIG. 3 shows the subject clamping device, at an engagement position thereof, as cross-sectioned perpendicularly to the cavities defined on the channel;

FIG. 4 shows the clamping device, at an engaged position thereof, and seen according to a cross section perpendicular to the channel cavities;

FIG. 5 is a schematic view showing a cable restraining fitting;

FIG. 6 is a perspective view showing a rod cable restraining fitting; and

DESCRIPTION OF THE PREFERRED EMBODIMENT

Figure 1:
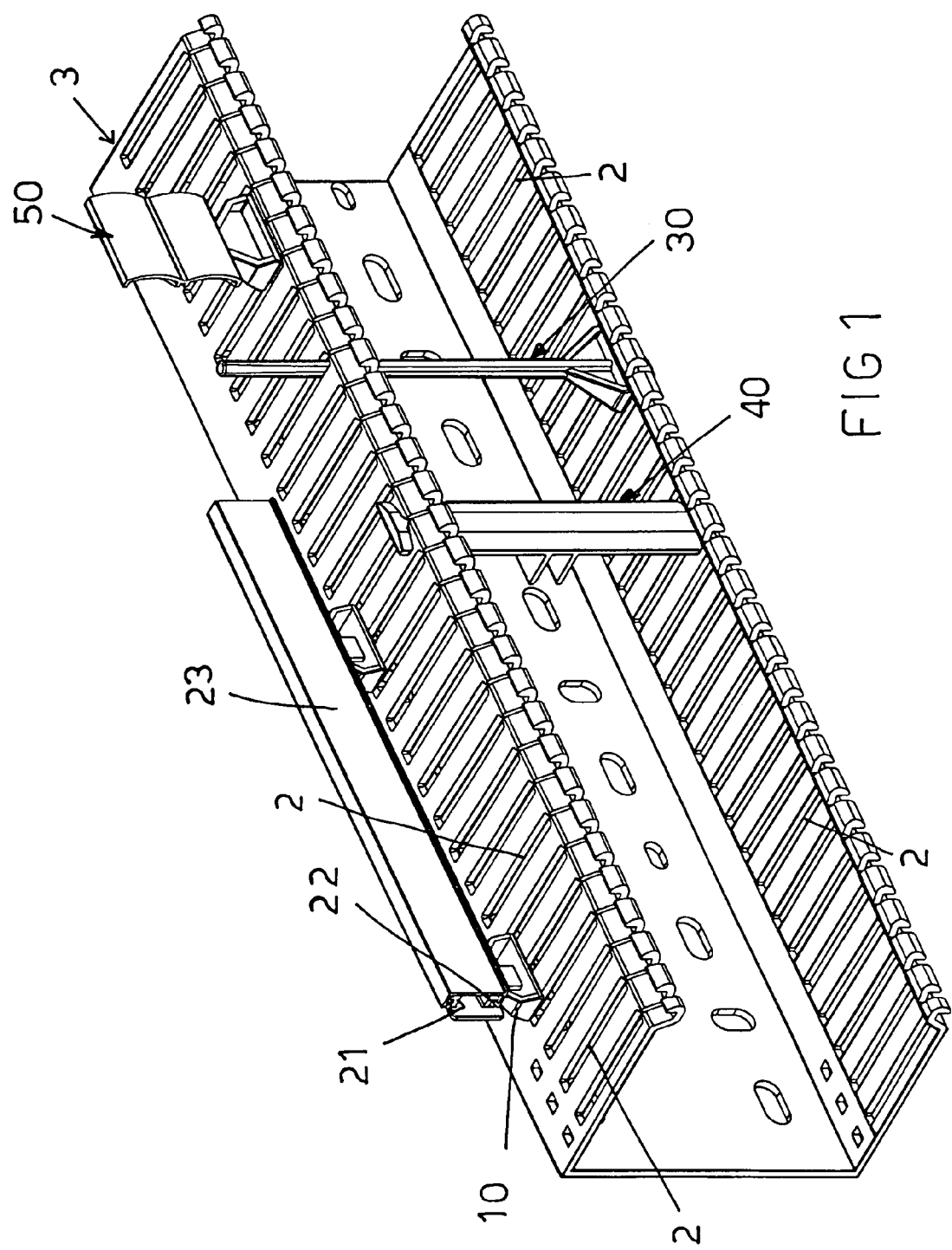
FIG. 1 shows a channel to which a clamping device for clamping fittings according to the present invention has been applied.

With reference to the number references of the above mentioned figures, the clamping device for clamping fittings in electric board channels, according to the present invention, comprises a rod or bar element, generally indicated by the reference number 1, which has an elongated configuration, for engagement in cavities 2 provided in conventional channels 3.

More specifically, said rod element comprises, at the free end portions thereof, upward projecting elements 4.

At a middle portion of said rod element 1, an end piece 5, of restrained configuration, and having a width substantially corresponding to the width of the cavities 2, is herein provided.

To the thus constructed clamping device, is connected a supporting body, generally indicated by the reference number 10, for coupling several fittings thereto.

Figure 2:
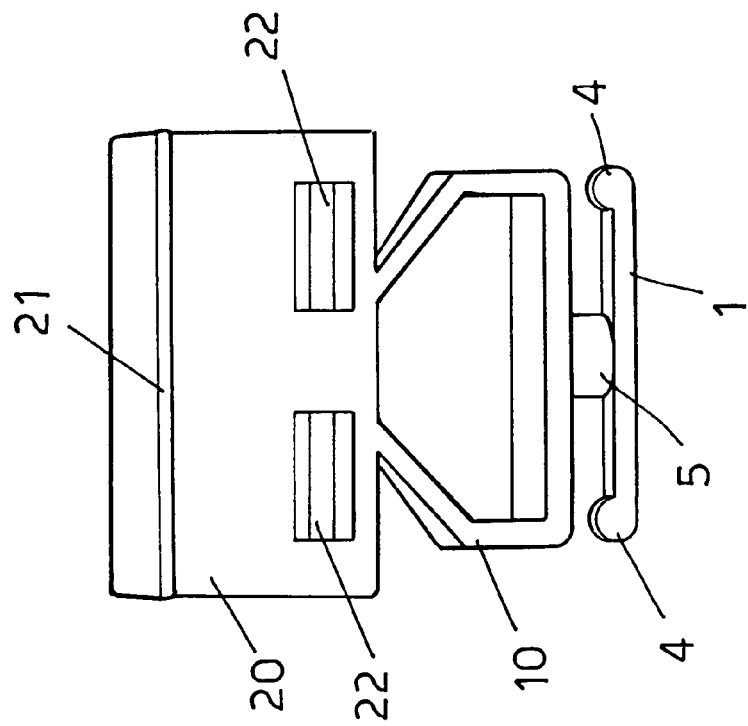
FIG. 2 shows a clamping device coupled to an adhesive label bearing fitting.

More specifically, FIGS. 2 and 3 show a plate fitting 20, including opposite tooth elements 21 and 22, allowing an adhesive label bearing rod 23 to be engaged therein, as is clearly shown in FIG. 1.

To provide the connection, the bar element 1 is at first engaged in the cavity 2, and then is turned through 90° thereby locking the supporting body 10 against the channel 2.

The subject clamping device, as disclosed, allows to easily perform several clamping solutions.

In particular, it is possible to provide cable restraining arrangements, in which the supporting body is connected to a rod-like element, indicated by 30, having such a length as to project from the opposite edge portion of the channel, thereby providing a cable restraining or holding element.

A further possible embodiment of cable restraining elements, a shown in FIG. 5, comprises, arranged between the rod elements, also indicated by the reference number 1, a rod plate 40, operating as a cable restraining members and being properly arranged through a rotary movement through 90°, after having engaged the rod element 1 in the above mentioned cavities.

Figure 7:
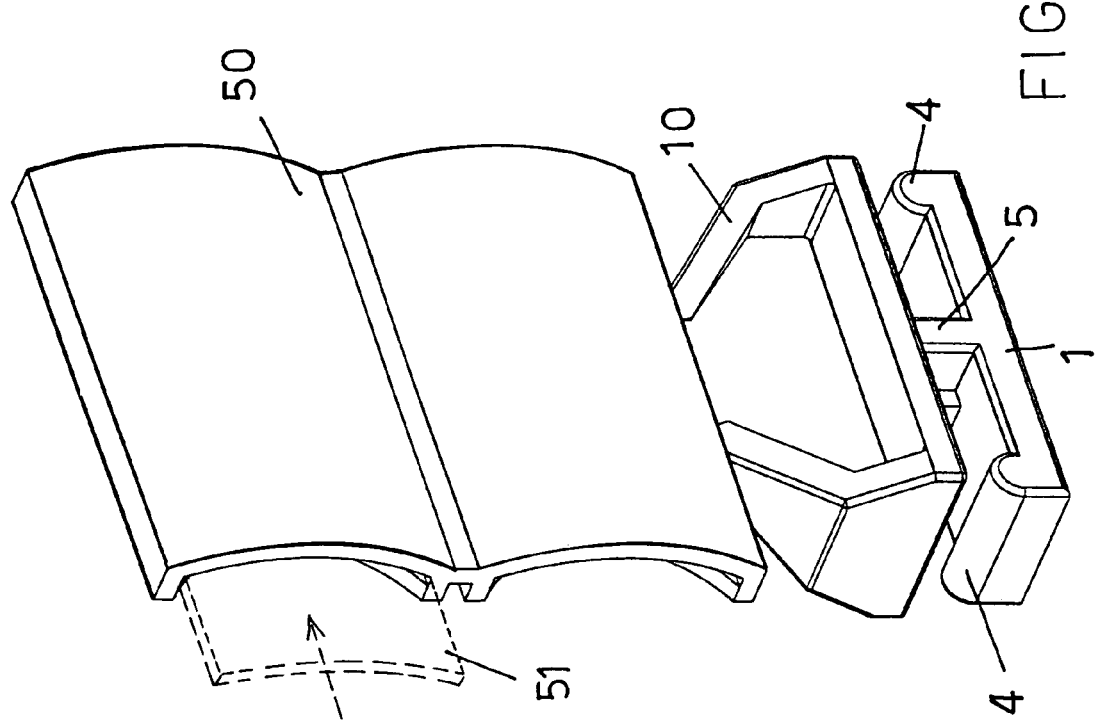
FIG. 7 shows a label bearing fitting.

As shown in FIG. 7, the supporting body 10 could be connected to a label holder, generally indicated by the reference number 50, which is advantageously made of an optically clear material, thereby allowing labels, generally indicated by the reference number 51, to be easily engaged in its inside.

From the above disclosure it should be apparent that the invention fully achieves the intended aim and objects.

In particular, the fact is to be pointed out that the invention provides a clamping device for coupling fittings in electric board channels and the like, which is very flexible and operatively simple, thereby allowing to provide a simple and quick clamping.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. A clamping device for clamping fittings in an electric board channel, said channel having a channel cavity and channel spaced legs, characterized in that said clamping device comprises a rod element which can be engaged in a cavity defined in said channel for electric components and being coupled, through a coupling end piece of said rod element, to a fitting supporting body, said fitting supporting body being adapted to be locked in said channel by a rotary movement of said body about an axis substantially perpendicular to said rod element.

2. A clamping device, according to claim 1, characterized in that said rod element has rod element end portions including upward projecting elements for coupling to said cavity of said channel, the rod element being arranged perpendicular to said cavity of the said channel in which the rod element is engaged.

3. A clamping device, according to claim 1, characterized in that said rod element comprises a plurality of opposite tooth elements for connection with a self-adhesive label supporting section member.

4. A clamping device, according to claim 1, characterized in that said rod element operates as a cable restraining member.

5. A clamping device, according to claim 1, characterized in that said clamping device comprises two bar elements coupled to one another by a coupling plate, for connecting a cable restraining device to two said spaced legs of said channel.

6. A clamping device, according to claim 1, characterized in that said clamping device comprises an optically clear material label holder coupled to said supporting body.

* * * * *